Sept. 18, 1923.                    1,468,564
I. GREENE
CULINARY ARTICLE
Filed Feb. 25, 1922

Ida Greene  INVENTOR
BY Victor J. Evans  ATTORNEY

Patented Sept. 18, 1923.

1,468,564

UNITED STATES PATENT OFFICE.

IDA GREENE, OF DARLINGTON, WISCONSIN, ASSIGNOR OF ONE-HALF TO ETTA ALBERTSON, OF DARLINGTON, WISCONSIN.

CULINARY ARTICLE.

Application filed February 25, 1922. Serial No. 539,207.

*To all whom it may concern:*

Be it known that I, IDA GREENE, a citizen of the United States, residing at Darlington, in the county of Lafayette and State of Wisconsin, have invented new and useful Improvements in Culinary Articles, of which the following is a specification.

This invention relates to improvements in culinary articles and has for an object the provision of means for permitting the escape of steam from pies to prevent the juices from being forced outward around the edges of the pie and to reduce danger of the pie crust sticking to the plate.

Another object of the invention is the provision of an article of this character which is simple in construction, positive in operation and which may be kept in a clean and sanitary condition.

With the above and other objects in view, the invention further includes the following novel features and details of construction, to be hereinafter more fully described, illustrated in the accompanying drawings and pointed out in the appended claims.

In the drawings:—

Figure 1:
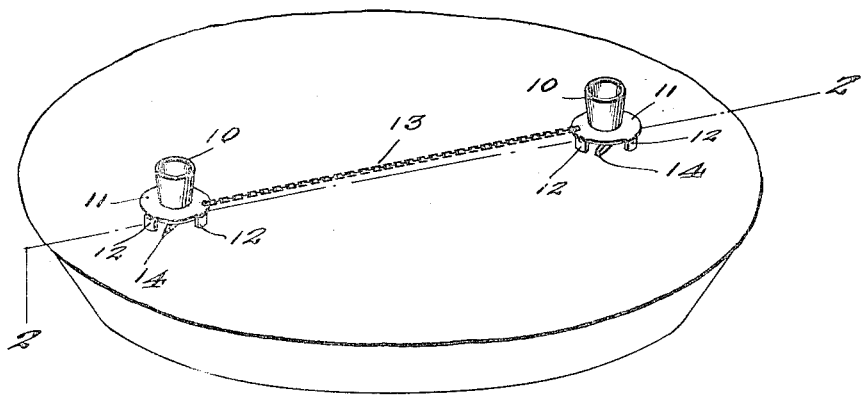
Figure 1 is a perspective view of a pie showing the use of the invention.
Figure 2:
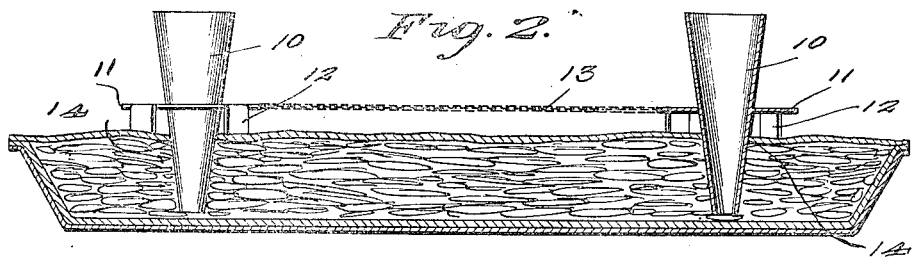
Figure 2 is an enlarged sectional view on the line 2—2 of Figure 1.
Figure 3:
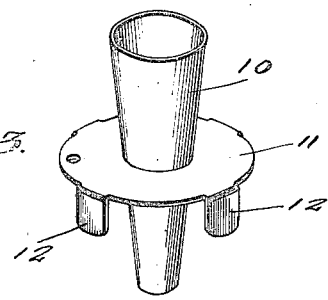
Figure 3 is a detail perspective view of one of the vent tubes.

Referring in detail to the drawings, wherein like characters of reference denote corresponding parts, the invention as illustrated, includes a substantially tubular member 10 which is preferably flared from its lower to its upper end and has each end turned to provide a smooth edge. Surrounding the member 10 intermediate its edge, is a plate or disk 11 which is provided with downwardly extending right angularly arranged feet 12.

In the use of the invention, two of the vent tubes are provided and are preferably connected by means of a chain 13 which has its opposite ends secured to the plates or disks 11. The vent tubes are inserted within slits or openings 14 which are spaced from the edge of the pipe, the small ends of the tubes extending inward to a depth governed by the contact of the feet 12 with the top crust of the pie. In addition to providing stops for limiting the insertion of the tube within the pie, the feet 12 form supports for maintaining the tubes in vertical position. The tubes thus provide means for free escape of steam from within the pie and prevent forcing the juices around the pie edges.

The chain 13 connects the vent tubes so as to prevent separation and accidental loss and at the same time provides convenient means by which the article may be hung from a hook.

The invention is susceptible of various changes in its form, proportions and minor details of construction and the right is herein reserved to make such changes as properly fall within the scope of the appended claims.

Having described the invention what is claimed is:—

1. A pie ventilator comprising a tube, a laterally extending member on said tube intermediate its ends, and supporting legs on the member extending substantially parallel with the axis of the tube and terminating short of one end of the tube.

2. A pie ventilator comprising a plurality of tubes, a laterally extending member on each of the tubes intermediate their ends, supporting legs on the members extending substantially parallel with the axis of the tube and terminating short of one end of the tube and a chain connecting the laterally extending members together.

In testimony whereof I affix my signature.

IDA GREENE.